Feb. 7, 1928.

N. V. REARDON

AUTOMATIC GAS SHUT-OFF VALVE

Original Filed July 24, 1926

1,658,099

Inventor.
Norbert V. Reardon
by Heard Smith & Tennant.
Attys

Patented Feb. 7, 1928.

1,658,099

UNITED STATES PATENT OFFICE.

NORBERT V. REARDON, OF ARLINGTON, MASSACHUSETTS.

AUTOMATIC GAS SHUT-OFF VALVE.

Application filed July 24, 1926, Serial No. 124,531. Renewed June 24, 1927.

This invention relates to automatic gas shut-off valves and has for its object to provide a novel valve of this type which is simple and inexpensive to manufacture but which is effective in operation.

These automatic gas shut-off valves are intended to be used for the purpose of automatically shutting off the supply of gas to a building in case of a fire in the vicinity of the valve and they are frequently constructed so that they can be manually closed from a remote point so as to enable the fireman to shut off the gas upon arrival at the fire.

In order to give an understanding of the invention I have illustrated in the drawings a selected embodiment thereof which will now be described after which the novel features will be pointed out in the appended claims.

Figure 1:
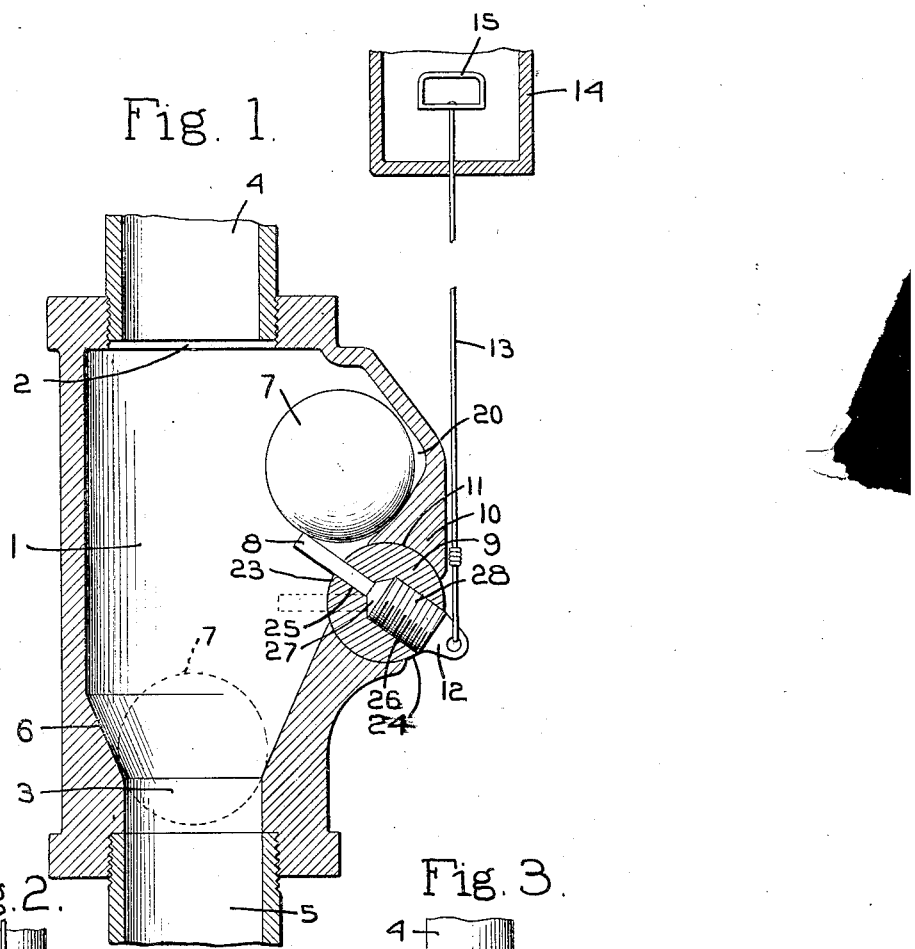
Fig. 1 is a sectional view of a gas shut-off valve embodying my invention.

My improved automatic shut-off valve comprises a casing 1 which is provided with an inlet 2 and an outlet or discharge 3. The inlet has connected thereto an inlet pipe 4 leading from a source of gas supply and the discharge opening 3 has a pipe 5 connected thereto which leads into the building. The discharge opening 3 is provided with a tapered or conical valve seat 6 which is adapted to be closed by a ball valve 7. This ball valve is normally held in inoperative position above the valve seat 6 by a supporting means having a fusible part so arranged that when this fusible part is fused the ball valve 7 will drop by gravity and fall into the dotted line position Fig. 1 thereby closing the discharge port and shutting off the supply of gas to the building.

The casing is preferably made with a pocket portion 20 in which the ball is received when it is in its inoperative position.

The fusible support for the ball is indicated at 8 and is shown in the form of an arm on which the ball rests and which retains the ball in the pocket 20. This fusible support is movably mounted so that it can be moved manually into a position where it will fail to support the ball and when so moved the ball will be spilled off from the end of the arm and will gravitate onto the valve seat 6. With this construction, therefore, the ball valve 7 will be seated when there is sufficient heat in the vicinity of the valve to fuse the ball support 8 or may be seated by manually moving the ball support 8 in its non-supporting position.

Figure 2:
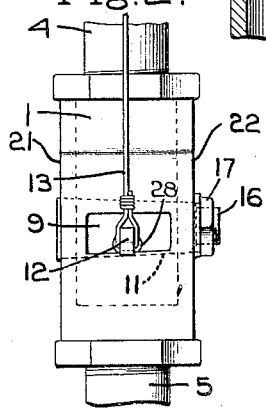
Fig. 2 is a front view thereof on a reduced scale.
Figure 3:
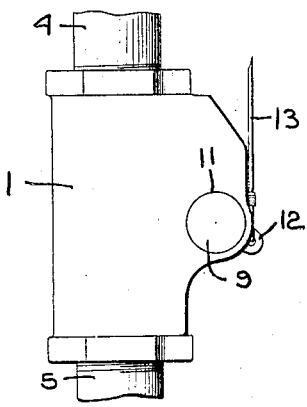
Fig. 3 is a side view thereof also on a reduced scale.

This fusible member 8 may be movably mounted in various ways without departing from the invention. In the present construction I have shown it as carried by a movable member in the form of a plug 9 which is mounted for rotation in the thickened portion 10 of the side wall of the casing. This plug is preferably tapered slightly as shown in Fig. 2 and the side wall of the casing is formed with a tapered or conical seat 11 in which the plug fits. The plug is preferably of a length to extend from one side face 21 of the valve casing through to the opposite side face 22 and it preferably has a diameter greater than the thickness of the thickened portion 10 of the wall so that the side faces of the plug project through the wall both on the inner face of the wall as shown at 23 and at the outer face as shown at 24. This plug fits the conical seat 11 with a gas tight fit so that there will be no leakage of gas around the plug. The plug may be tightened in its seat so as to maintain a gas tight joint by means similar to that employed in connection with an ordinary gas cock. The plug is provided at its small end with a threaded extension 16 on which is screwed a nut 17 that engages the side of the casing. By tightening the nut the plug will be drawn tightly to its seat.

When in normal position the plug is so placed that the fusible arm 8 is in a position to support the ball valve 7, as shown in full lines Fig. 1. Said plug may be turned, however, into the dotted line position and when so turned the ball will roll off from the arm 8 and drop onto the seat by gravity.

Any appropriate means may be provided for manually turning the plug from a point remote from the valve. As herein shown said plug is provided with a laterally-extending arm 12 to which is connected a pull connection 13 leading to a suitable box 14, said connection having a handle 15 located within the pull box and by which it may be operated to turn the plug 9. This pull box 14 may be located in any desirable position, as for instance in the sidewalk adjacent the building or in the exterior wall of the building.

In order to facilitate the assembling of the parts I propose to make the arm 8 so that it can be inserted into position after the plug is in its seat. The plug is provided with an aperture which extends transversely therethrough, the inner end 25 of the aperture being smaller than the outer end 26.

The fusible member 8 may be placed in position by inserting it through the transverse aperture in the plug after the plug has been placed in position in its seat 11. Said fusible member 8 is provided with a head 27 which rests against the shoulder formed where the two portions of the aperture of different diameter meet and said arm is held in position by a screw-threaded plug 28 which is screw threaded into the portion 26 of the aperture having the larger diameter. This plug 28 may conveniently have the arm 12 formed integral therewith.

The friction of the plug in its seat 11 is sufficient to prevent the plug being turned by the weight of the ball valve 7 so that normally said ball valve will be held in its inoperative position as shown in full lines Fig. 1. If, however, a fire occurs in the building and heat of a predetermined temperature is developed in the vicinity of the valve the fusible member 8 will become fused thus allowing the ball to drop into the dotted line position and thereby shutting off the flow of illuminating gas into the building. On the other hand, if the fire is in some portion of the building not adjacent the valve then the valve may be closed by manually operating the pull cord 13 thereby to turn the plug 9 into a position to allow the ball 7 to spill off from the arm 8.

The construction of the device is very simple and it is consequently inexpensive to manufacture. It is, however, effective in operation.

I claim.

1. In an automatic gas shut-off valve, the combination with a casing having an inlet and an outlet, the latter having a tapered valve seat, of a ball valve adapted to close said seat, a movable fusible member normally holding said ball in inoperative position above the valve seat, said fusible member when fused allowing the ball to drop onto its seat and close the outlet, and means operable from a point remote from the shut-off valve to move the fusible member into a position in which it fails to support the ball and allows it to drop onto the valve seat.

2. In an automatic gas shut-off valve, the combination with a casing having an inlet and an outlet, the latter having a tapered valve seat, of a ball valve adapted to close said seat, a plug mounted for turning movement in the wall of the casing, a fusible ball-supporting member carried by the plug and normally supporting the ball in inoperative position above the valve seat, and manual means for turning the plug into a position where the ball will roll off from said support.

In testimony whereof, I have signed my name to this specification.

NORBERT V. REARDON.